(12) United States Patent
Storry et al.

(10) Patent No.: US 7,733,790 B2
(45) Date of Patent: Jun. 8, 2010

(54) METHOD AND APPARATUS FOR VERIFYING SERVICE PROVISIONING IN NETWORKS USED TO PROVIDE DIGITAL SUBSCRIBER LINE SERVICES

(75) Inventors: Charles Michael Storry, Kemptville (CA); Luc Absillis, Raleigh, NC (US)

(73) Assignee: Alcatel Lucent, Paris (FR)

( * ) Notice: Subject to any disclaimer, the term of this patent is extended or adjusted under 35 U.S.C. 154(b) by 719 days.

(21) Appl. No.: 11/585,880

(22) Filed: Oct. 25, 2006

(65) Prior Publication Data

US 2008/0101401 A1    May 1, 2008

(51) Int. Cl.
*H04L 12/26* (2006.01)
(52) U.S. Cl. .................. 370/250; 370/244; 370/248
(58) Field of Classification Search .............. 370/463, 370/250, 244, 248
See application file for complete search history.

(56) References Cited

U.S. PATENT DOCUMENTS

| | | | |
|---|---|---|---|
| 6,285,671 B1 * | 9/2001 | Bossemeyer et al. ........ | 370/352 |
| 2002/0001307 A1 * | 1/2002 | Nguyen et al. .............. | 370/386 |
| 2004/0114525 A1 * | 6/2004 | Taylor et al. ................ | 370/244 |
| 2006/0187911 A1 * | 8/2006 | Huotari et al. .............. | 370/389 |
| 2006/0268856 A1 * | 11/2006 | Voit et al. ................... | 370/389 |
| 2007/0121664 A1 * | 5/2007 | Szczebak et al. ............ | 370/449 |

OTHER PUBLICATIONS

Triple Play Test Scenario, Field Installation and Maintenance of Triple Play Services, Market Description, CA www.spirentcom.com.
QT-200 DSL Test Solution, Acterna Test & Measurement Solutions, www.jdsu.com, 2006.

* cited by examiner

*Primary Examiner*—Huy D Vu
*Assistant Examiner*—Michael J Digiovanni
(74) *Attorney, Agent, or Firm*—Kramer & Amado P.C.

(57) ABSTRACT

A method and apparatus to permit testing of Layer 2 and higher services provisioned for a port on a digital subscriber line access multiplexer (DSLAM) line card. Each line card is provisioned with a virtual port, a virtual port cross-connect function, and a virtual port tunneling function. The virtual port can be linked to any physical port on the line card. A test host can link to the virtual port from anywhere in a network to perform verification of end-to-end service provisioning and functionality throughout a network.

18 Claims, 3 Drawing Sheets

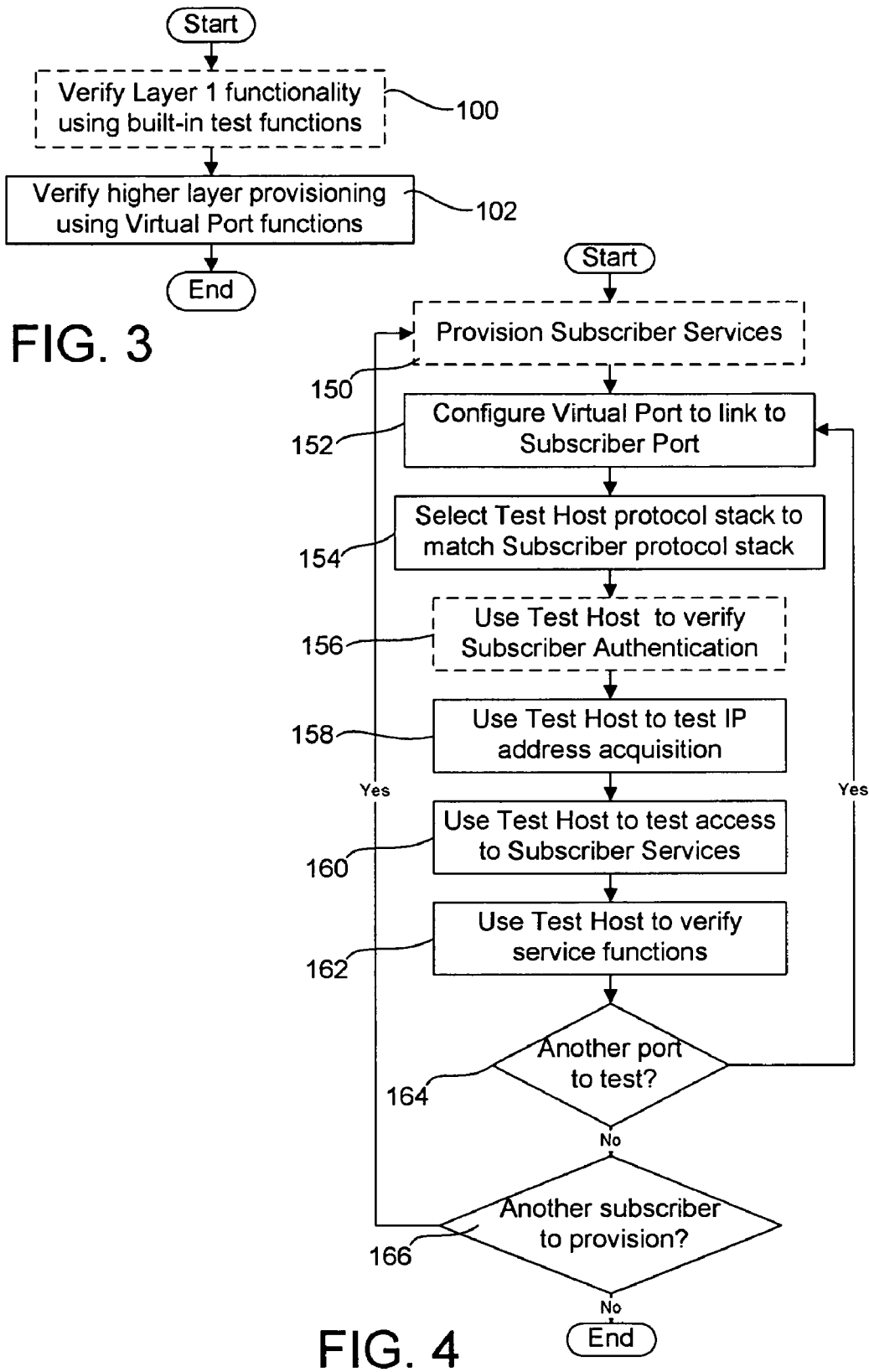

METHOD AND APPARATUS FOR VERIFYING SERVICE PROVISIONING IN NETWORKS USED TO PROVIDE DIGITAL SUBSCRIBER LINE SERVICES

CROSS-REFERENCE TO RELATED APPLICATIONS

This is the first application filed for the present invention.

MICROFICHE APPENDIX

Not Applicable.

TECHNICAL FIELD

The present invention relates in general to the provision of Digital Subscriber Line (DSL) service and, in particular, to the verification of end-to-end service provisioning and functionality throughout a network used to provide DSL service to DSL service subscribers.

BACKGROUND OF THE INVENTION

FIG. 1 schematically illustrates a prior art Digital Subscriber Line Access Multiplexer (DSLAM) 10 used to provide high-speed Internet (and optionally telephone service) access to service subscribers 12 in a manner well known in the art. The DSLAM 10 includes a plurality of line cards 14. Each line card 14 is provisioned with a plurality of DSL ports 16, typically 24 or 48 DSL ports 16. Each subscriber 12 is connected to one of the DSL ports 16 by a subscriber line 18 via a DSL modem 19, also in a manner well known in the art. The line cards 14 are further provisioned with interworking functions 22, which perform interworking feature processing 24. The line cards 14 are connected to a Local Area Network (LAN) switch 26, which is in turn directly or indirectly connected to a service provider network 28. The communications path 30 to the administrative workstation 20 may include multiple service provider networks (e.g. Service Provider A 28, Service Provider B 29, and Service Provider C 31).

As understood by those skilled in the art, subscriber services provided to the subscriber 12 by the DSLAM 10 must be provisioned using an administrative workstation 20, which is typically not connected directly to the DSLAM 10. Service provisioning can be complex and frequently requires verification or troubleshooting. Traffic flows bidirectionally between the subscriber 12 and the service provider 28 via a communications path 30. Provisioned interworking features are processed by interworking feature processing 24. If an error is made during service provisioning, service to the subscriber 12 may be denied, or the service provided may not accord with their service subscription.

In order to verify service provisioning, test heads 32 have been invented. The test head 32 is designed to be connected to a test bus interface on the line cards 14 of the DSLAM 10, as schematically shown. Any DSL port 16 can be administratively connected to the test bus (not shown) and thereby to the test head. Although the test heads 32 were originally designed to test only the physical layer of connectivity to the subscriber 12, the functionality of some test heads 32 has been enhanced to permit testing of higher layer functionality via the integration of reference DSL customer premise equipment (CPE), which can verify the service provisioning. However, the capital cost of such test heads can be prohibitive. Furthermore, there is a growing trend toward locating DSLAMs remotely in Fiber to the Neighborhood (FTTN) deployments. These deployments typically support fewer DSL customers thereby further increasing the cost per subscriber of deploying a test head.

In order to reduce operating costs, equipment self-testing for verifying physical layer connections has been invented. An example of this is built-in single-ended line testing (SELT) and dual-ended line testing (DELT) in DSL transceivers. However, Layer 2 and higher provisioning can still only be tested using a specially equipped test head, as explained above.

There therefore exists a need for a method and apparatus for verifying end-to-end service provisioning and functionality throughout a network used to provide DSL services.

SUMMARY OF THE INVENTION

It is an object of the invention to provide a method and apparatus for verifying end-to-end service provisioning and functionality throughout a network used to provide DSL services.

The invention therefore provides a line card for a digital subscriber line access multiplexer (DSLAM), comprising: a plurality of physical ports, each physical port supporting a connection to a digital subscriber line; and a virtual port that appears to an administrator workstation as a test port on the line card, the virtual port being configured to permit a test host to link to subscriber services provisioned for a physical port to be tested on the line card, to permit Layer 2 and higher testing of those subscriber services.

The invention further provides a digital subscriber line access multiplexer (DSLAM), comprising a plurality of line cards, each of the line cards comprising a plurality of physical ports, each physical port supporting a connection to a digital subscriber line, and a virtual port that appears to an administrator workstation to be a test port on the line card, the virtual port being configured to permit a test host to link to subscriber services provisioned for any physical port to be tested on the line card, to permit Layer 2 and above testing of the subscriber services provisioned for that physical port.

The invention yet further provides a method of verifying end-to-end service provisioning and functionality throughout a network used to provide digital subscriber line service to a service subscriber connected to a digital subscriber line access multiplexer (DSLAM), comprising: configuring a virtual port on the line card to link to the provisioned subscriber services; selecting a test host protocol stack to match a protocol stack of customer premises equipment used by the subscriber; logically connecting to the virtual port using the test host; and operating the test host to test the provisioned subscriber services.

BRIEF DESCRIPTION OF THE DRAWINGS

Further features and advantages of the present invention will become apparent from the following detailed description, taken in combination with the appended drawings, in which:

FIG. 3 is a flow chart illustrating a method in accordance with the invention; and FIG. 4 is a flow chart illustrating a test scenario using the access multiplexer shown in FIG. 2.

It should be noted that throughout the appended drawings, like features are identified by like reference numerals.

DETAILED DESCRIPTION OF PREFERRED EMBODIMENTS

The invention provides a method and apparatus for verifying end-to-end service provisioning and functionality throughout a network used to provide digital subscriber line service to a service subscriber connected to a digital subscriber line access multiplexer (DSLAM). DSL access multiplexers (DSLAMs) are equipped with line cards provisioned with enhanced interworking functions that include a virtual port in addition to the normal complement of physical ports on the line card. The interworking functions are further enhanced to include a virtual port cross-connect function, and a virtual port tunneling function. The virtual port cross-connect function relays to the virtual port all traffic addressed to a physical DSL port being tested. The virtual port tunneling function encapsulates/de-encapsulates traffic sent between the virtual port and a test host, which may be located anywhere in the network. The virtual port may be remotely configured to test any one of the DSL ports on a DSLAM line card. The virtual port is used to test higher-layer service functionality to ensure that the DSL port is correctly provisioned. Time and operating costs are therefore reduced, and the provision of subscribed-to services is assured.

Figure 1:
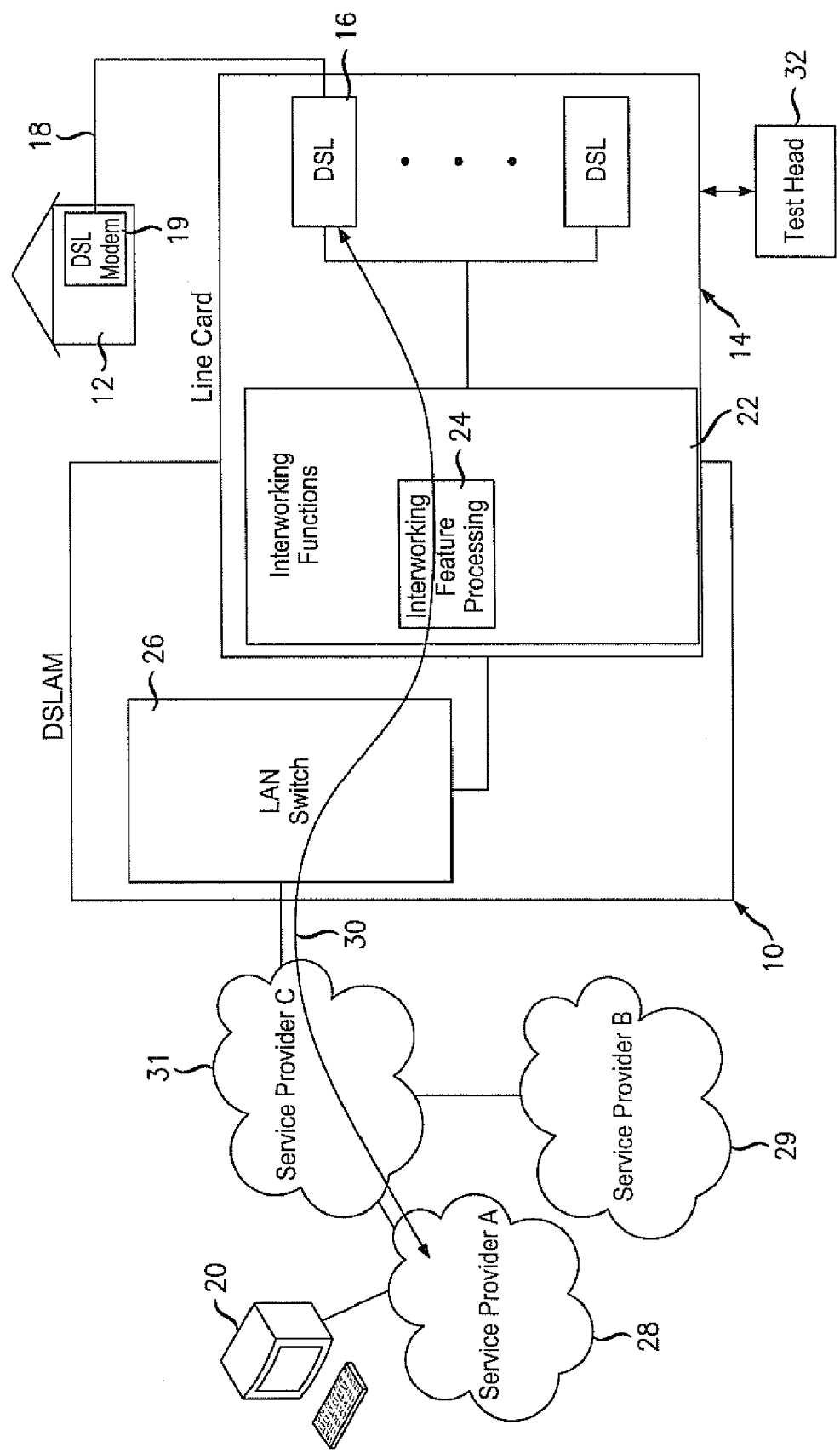
FIG. 1 is a schematic diagram of a prior art network configuration for providing digital subscriber line (DSL) service to service subscribers.
Figure 2:
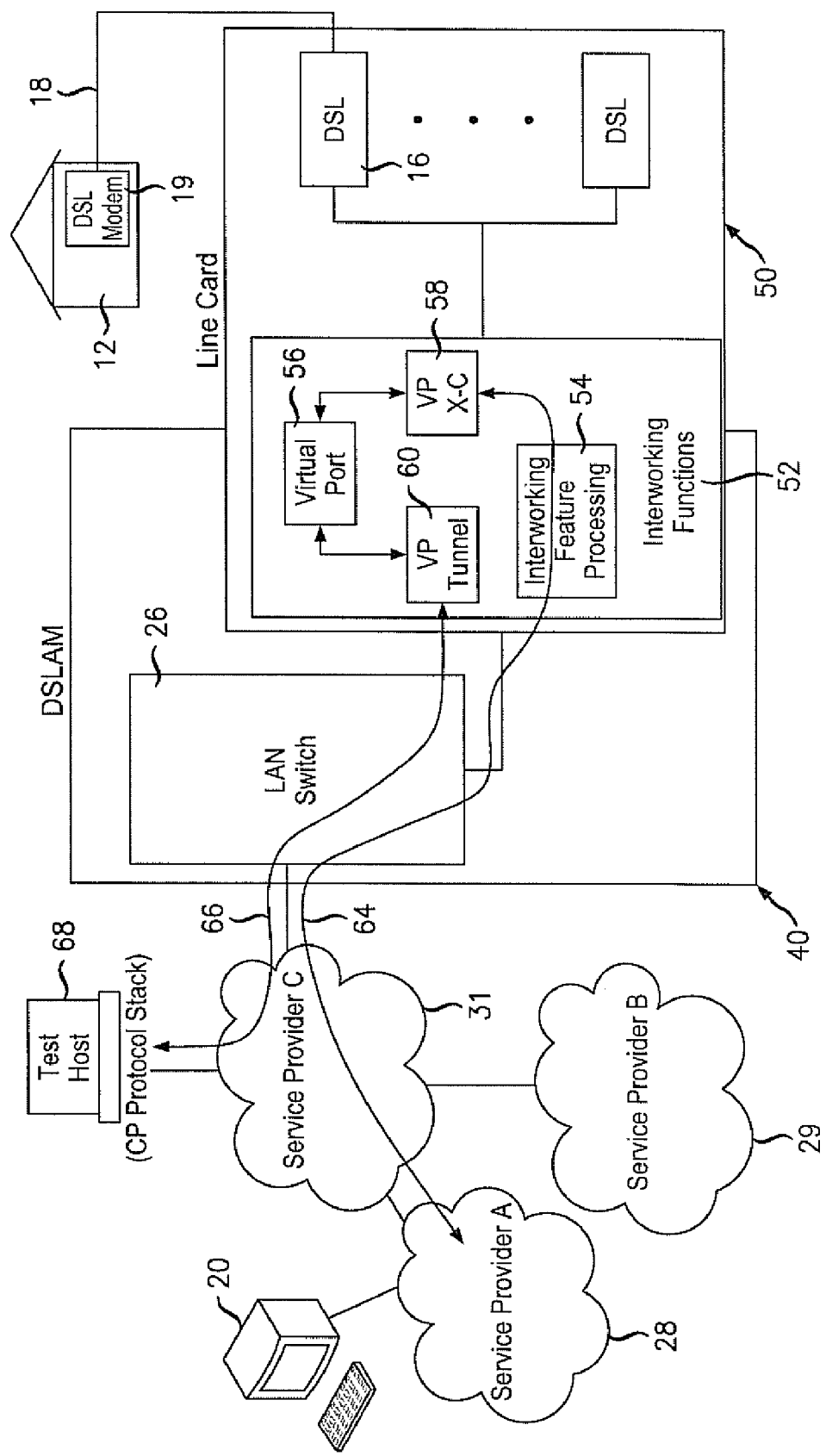
FIG. 2 is a schematic diagram of a network configured with an access multiplexer in accordance with the invention for providing DSL services to service subscribers.

FIG. 2 is a schematic diagram of a DSLAM 40 provisioned with line cards 50 in accordance with the invention. The Interworking Functions 52 of the line cards 50 include Interworking Feature Processing 54, which works in the same way as described above with reference to FIG. 1. The Interworking Functions 52 are also provisioned with a virtual port 56, a virtual port cross-connect function 58, and a virtual port tunneling function 60. This permits a test host 68 to test the Layer 2 and above services provisioned for any DSL port 16 on the line card 50, as will be explained below in more detail.

The virtual port 56 provides a test port on each line card 50. In one embodiment the test port is configured as an "extra" port on the line card. Consequently, if the line card 50 has 48 ports, the virtual port 56 appears to an administrator workstation 20 as the $49^{th}$ port. The forwarding model for the virtual port 56 is provisioned in the same way as any other DSL port 16, but it is normally provisioned in cross-connect mode to enable transparent forwarding of all traffic.

The virtual port cross-connect function 58 operates at the Ethernet layer (before line aggregation which combines multiple independent DSL lines into a single logical channel (bonding) or segmentation and reassembling (SARing)) and forwards Ethernet frames addressed to the DSL port 16 being tested to the virtual port 56. This is a service-affecting configuration in which downstream traffic is forwarded via communications path 64 to the virtual port 56 only after any provisioned interworking feature processing 54 is performed. Likewise, traffic received by the virtual port 56 via communications path 66 from the test host 68 is forwarded from the virtual port 56 to the interworking feature processing 54 via the virtual port cross-connect function 58. During testing, data flow to the physical DSL port 16 is redirected to the virtual port 56 for the duration of a test session.

All traffic sent to/from the test host 68 via the communications path 66 is tunneled by the virtual port tunneling function 60. The virtual port tunneling function 60 is, for example, a dedicated virtual local area network (VLAN). In order to ensure that an exact customer traffic flow is evaluated, the virtual port tunneling requires an extra Ethernet header; IP-in-IP tunneling; multi-protocol label switching (MPLS); or VLAN stacking, such as Virtual Private LAN Service (VPLS).

FIG. 3 is a flow chart illustrating the method in accordance with the invention. In accordance with the method, Layer 1 functionality is optionally verified (100) using built-in test functions of the DSLAM 40. This testing is normally performed if a new DSL subscriber is connected to the DSLAM 40, or a subscriber line problem is reported such as a loss of service. Higher layer functionality is then tested using the virtual port 56 and the virtual port functions 58, 60 described above with reference to FIG. 2 (102). The testing of higher layer functionality is performed whenever a new subscriber is provisioned on the DSLAM 40. The testing of higher layer functionality is also performed whenever a subscriber reports a subscription issue. As explained above, the testing of higher layer functionality can be performed remotely using the test host 68, which may be located anywhere in the network. In order to test the higher layer functionality, the test host 68 is provisioned with a customer premises (CP) protocol stack that matches a protocol stack used by the subscriber 12 for which the test is being conducted. As understood by those skilled in the art, the protocol stack may be any one of, or any combination of: point-to-point protocol (PPP); Dynamic Host Configuration Protocol (DHCP); Ethernet 802.1X; or any other host protocol.

FIG. 4 is a flow chart illustrating a test scenario using the DSLAM 40 shown in FIG. 2. If the subscriber is a new subscriber, subscriber services must be provisioned (150) using, for example, the administrator's workstation 20 (FIG. 2). The virtual port 56 must then be configured (152) to link to the subscriber DSL port 16 to be tested. The virtual port 56 is provisioned so that it can be linked to only one DSL port 16 at any given time. A test host protocol stack is then selected to match the subscriber protocol stack (154). Testing of the provisioned subscribers services can then begin.

If the service subscription mandates subscriber authentication, the test host 68 is used to verify subscriber authentication (156). Subscriber authentication may entail, for example, verifying successful 802.1X authentication (correct Remote Authentication Dial-In User Service (RADIUS) authentication configuration). The test host is then used to test Internet Protocol (IP) address acquisition (158). If an IP address is correctly acquired, the test host 68 is used to test access to subscriber services (160), in a manner well known in the art. The test host is then used to verify service functions (162). This may be performed, for example, by: using File Transfer Protocol (FTP) to transfer any known file to/from the Internet; connecting to a Voice over Internet Protocol (VoIP) test signal; connecting to a web site; etc.

On completion of the testing of subscriber service provisioning, it is determined whether there is another DSL port 16 to test (164). If so, the configuration and testing described above with reference to 152-162 is repeated. If it is determined that there is not another DSL port 16 to test, it is determined whether there is another subscriber to provision (166). If so, the provisioning, configuration and testing described above with reference to 150-162 is repeated. Otherwise, the process ends.

The invention therefore provides a simple, economic solution to permit remote testing of DSL subscriber service provisioning from anywhere in a network. Operating costs are therefore reduced and subscriber service assurance is enhanced.

The embodiments of the invention described above are intended to be exemplary only. The scope of the invention is intended to be limited solely by the scope of the appended claims.

We claim:

1. A line card for a digital subscriber line access multiplexer DSLAM) connected to a service provider network, the line card comprising:
   a plurality of physical ports, each physical port supporting a connection to a digital subscriber line (DSL) provisioned for subscriber services; and
   a virtual port that appears to an administrator workstation located in the service provider network as a test port on the line card, the virtual port being configured to permit a test host to link through the service provider network via a virtual port tunneling function to a physical port on the line card to permit Layer 2 and above testing of the subscriber services to the line card;
   a virtual port cross-connect function that forwards all traffic addressed to the physical port from an interworking feature processing block to the virtual port, and forwards all traffic from the virtual port to the interworking feature processing block; and
   a virtual port tunneling function that provides an exact customer traffic flow to the test host by encapsulating all traffic sent from the virtual port to the test host and de-encapsulates all traffic sent from the test host to the virtual port ensuring that the exact customer traffic flow is evaluated at the test host.

2. The line card as claimed in claim 1, wherein the virtual port is configured to transparently forward all traffic addressed to the physical port.

3. The line card as claimed in claim 1, wherein the virtual port cross-connect function is configured to operate at the Ethernet layer prior to line aggregation, which combines multiple independent DSL lines into a single logical channel, or prior to segmentation and reassembling.

4. The line card as claimed in claim 1, wherein the virtual port tunneling function comprises a dedicated virtual local area network (VLAN).

5. The line card as claimed in claim 1, wherein the virtual port tunneling function comprises: one of an extra Ethernet header; IP-in-IP tunneling; multi-protocol label switching (MPLS); or VLAN stacking to ensure that the exact customer traffic flow is evaluated.

6. The line card as claimed in claim 5, wherein the VLAN stacking comprises a Virtual Private LAN Service (VPLS).

7. A digital subscriber line access multiplexer (DSLAM) connected to a service provider network, the DSLAM comprising:
   a plurality of line cards, each of the line cards comprising a plurality of physical ports, each physical port supporting a connection to a digital subscriber line (DSL);
   a virtual port that appears to an administrator workstation located in the service provider network to he a test port on the line card, the virtual port being configured to permit a test host to link to subscriber services provisioned for a physical port to be tested on the line card, to permit Layer 2 and above testing of the subscriber services provisioned for the physical port;
   a virtual port cross-connect function that forwards all traffic addressed to the physical port from an interworking feature processing block to the virtual port, and forwards all traffic from the virtual port to the interworking feature processing block; and
   a virtual port tunneling function that encapsulates all traffic sent from the virtual port to the test host and de-encapsulates all traffic sent from the test host to the virtual port.

8. The DSLAM as claimed in claim 7, wherein the virtual port as configured to transparently forward all traffic addressed to the physical port.

9. The DSLAM as claimed in claim 7, wherein the virtual port cross-connect function is configured to operate at the Ethernet layer prior to line aggregation, which combines multiple independent DSL lines into a single logical channel or prior to segmentation and reassembling.

10. The DSLAM as claimed in claim 7, wherein the virtual port tunneling function comprises a dedicated virtual local area network (VLAN).

11. The DSLAM as claimed in claim 7, wherein the virtual port tunneling function comprises: one of: an extra Ethernet header; IP-in-IP tunneling; multi-protocol label switching (MPLS); or VLAN stacking to ensure that an exact customer traffic flow is evaluated.

12. The DSLAM as claimed in claim 11, wherein the VLAN stacking comprise a Virtual Private LAN Service (VPLS).

13. A method of verifying end-to-end service provisioning and functionality throughout a network used to provide digital subscriber line service to a service subscriber connected to a digital subscriber line access multiplexer (DSLAM) comprising:
   configuring a virtual port on the line card to link to the provisioned subscriber services;
   selecting a test host protocol stack to match a protocol stack of customer premises equipment used by the subscriber;
   logically connecting the virtual port to the test host through the network via a virtual port tunneling function;
   forwarding all traffic addressed to a physical port from an interworking feature processing block to the virtual port;
   forwarding all traffic from the virtual port to the interworking feature processing block;
   encapsulating all traffic sent from the virtual port to the test host;
   de-encapsulating all traffic sent from the test host to the virtual port; and
   operating the test host to verify the provisioned subscriber services.

14. The method as claimed in claim 13, wherein operating the test host to test the provisioned subscriber services comprises:
   verifying subscriber authentication.

15. The method as claimed in claim 13, wherein operating the test host to test the provisioned subscriber services comprises:
   testing Internet Protocol (IP) address acquisition.

16. The method as claimed in claim 13, wherein operating the test host to test the provisioned subscriber services comprises:
   testing access to subscriber services.

17. The method as claimed in claim 13, wherein operating the test host to test the provisioned subscriber services comprises:
   verifying service functions.

18. The method as claimed in claim 17 wherein verifying the service functions comprises:
   at least one of
      using File Transfer Protocol (FTP) to transfer a file to or from the Internet;
      connecting to a Voice over Internet Protocol (VoIP) test signal; and
      connecting to a web site.

* * * * *

UNITED STATES PATENT AND TRADEMARK OFFICE
CERTIFICATE OF CORRECTION

| | | |
|---|---|---|
| PATENT NO. | : 7,733,790 B2 | Page 1 of 1 |
| APPLICATION NO. | : 11/585880 | |
| DATED | : June 8, 2010 | |
| INVENTOR(S) | : Charles Michael Storry et al. | |

It is certified that error appears in the above-identified patent and that said Letters Patent is hereby corrected as shown below:

Column 5, Claim 1, line 3, please change "DSLAM)" to "(DSLAM)"

Column 5, Claim 7, line 51, change "he" to "be"

Column 6, Claim 8, line 2, change "as" to "is"

Column 6, Claim 12, line 18, change "comprise" to "comprises"

Signed and Sealed this

Twenty-seventh Day of July, 2010

David J. Kappos
*Director of the United States Patent and Trademark Office*